(12) United States Patent
Spahr et al.

(10) Patent No.: US 9,666,854 B2
(45) Date of Patent: *May 30, 2017

(54) GRAPHITE MATERIAL

(71) Applicant: IMERYS GRAPHITE & CARBON SWITZERLAND SA, Bodio (CH)

(72) Inventors: Michael E. Spahr, Bellinzona (CH); Curzio Nessi, Iragna (CH); Salvatore Stallone, S. Antonino (CH); Eberhard Waldhor, Arbon (CH); Grivei Eusebiu, La Hulpe (BE); Nicolas Probst, Brussels (BE)

(73) Assignee: Imerys Graphite & Carbon Switzerland SA, Bodio (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,628

(22) Filed: Oct. 30, 2015

(65) Prior Publication Data

US 2016/0156014 A1    Jun. 2, 2016

Related U.S. Application Data

(63) Continuation of application No. 13/147,012, filed as application No. PCT/EP2010/051314 on Feb. 3, 2010, now Pat. No. 9,196,904.

(60) Provisional application No. 61/149,369, filed on Feb. 3, 2009.

(30) Foreign Application Priority Data

Feb. 3, 2009   (EP) .................................. 09151938

(51) Int. Cl.
| | |
|---|---|
| *H01M 4/02* | (2006.01) |
| *C01B 31/04* | (2006.01) |
| *C09D 5/24* | (2006.01) |
| *C09D 7/12* | (2006.01) |
| *H01M 4/62* | (2006.01) |
| *H01M 6/06* | (2006.01) |
| *C09D 1/00* | (2006.01) |
| *C10M 103/02* | (2006.01) |
| *H01B 1/04* | (2006.01) |
| *C08K 3/04* | (2006.01) |
| *H01M 10/0525* | (2010.01) |

(52) U.S. Cl.
CPC ............... *H01M 4/02* (2013.01); *C01B 31/04* (2013.01); *C09D 1/00* (2013.01); *C09D 5/24* (2013.01); *C09D 7/1216* (2013.01); *C09D 7/1283* (2013.01); *C10M 103/02* (2013.01); *H01B 1/04* (2013.01); *H01M 4/625* (2013.01); *H01M 6/06* (2013.01); *C01B 2204/22* (2013.01); *C01B 2204/32* (2013.01); *C08K 3/04* (2013.01); *H01M 10/0525* (2013.01); *Y10T 428/2982* (2015.01)

(58) Field of Classification Search
CPC .... H01M 4/625; H01M 6/06; H01M 10/0525; C01B 31/04; C08K 3/04; C09D 5/24; C09D 7/1216; C09D 7/1283; Y10T 428/2982
USPC ................... 428/402; 106/286.8; 241/15, 30; 252/502; 423/448
See application file for complete search history.

(56) References Cited

U.S. PATENT DOCUMENTS

| | | | |
|---|---|---|---|
| 5,736,076 A * | 4/1998 | Meissner | B01J 19/30 264/29.1 |
| 5,897,068 A | 4/1999 | Stehr | |
| 6,171,701 B1 * | 1/2001 | Moore | G21K 1/06 423/448 |
| 6,460,791 B1 | 10/2002 | Stehr | |
| 7,115,221 B1 * | 10/2006 | Spahr | C01B 31/04 264/15 |
| 9,196,904 B2 * | 11/2015 | Spahr | C01B 31/04 |
| 2004/0053050 A1 * | 3/2004 | Guerfi | C01B 31/04 428/403 |
| 2006/0046146 A1 * | 3/2006 | Tsuji | H01M 4/06 429/232 |
| 2006/0147796 A1 * | 7/2006 | Miura | H01M 4/0404 429/209 |

(Continued)

FOREIGN PATENT DOCUMENTS

| | | |
|---|---|---|
| EP | 0 738 018 A1 | 10/1996 |
| JP | 62-046910 | 2/1987 |

(Continued)

OTHER PUBLICATIONS

Kim, Byoung G.; Choi, Sang K.; Chung, Hun S.; Lee, Jae J., and Saito, F., "Grinding characteristics of crystalline graphite in low-pressure attrition system", Powder Technology, vol. 126, 2002, pp. 22-27—XP-002540464.

(Continued)

*Primary Examiner* — Leszek Kiliman
(74) *Attorney, Agent, or Firm* — Finnegan, Henderson, Farabow, Garrett & Dunner LLP

(57) ABSTRACT

A graphite powder may include highly oriented grain aggregates, wherein the electrical resistivity of the powder decreases with increasing density. A process for coating a substrate may include providing a coating dispersion including such a graphite powder and applying the coating dispersion to the substrate. An electrode may contain such a graphite powder. A coating dispersion may include such a graphite powder dispersed in a liquid medium. A battery may include such a graphite powder. A compressed body of pure graphite may include such a graphite powder. A lubricant may include such as graphite powder.

20 Claims, 5 Drawing Sheets

(56) References Cited

U.S. PATENT DOCUMENTS

| | | | |
|---|---|---|---|
| 2006/0228630 A1* | 10/2006 | Honbo | C01B 31/04 429/231.8 |
| 2006/0286025 A1 | 12/2006 | Spahr et al. | |
| 2008/0206124 A1 | 8/2008 | Jang et al. | |
| 2009/0022649 A1 | 1/2009 | Zhamu et al. | |
| 2013/0323600 A1 | 12/2013 | Guerfi et al. | |

FOREIGN PATENT DOCUMENTS

| | | |
|---|---|---|
| JP | 02-204317 | 8/1990 |
| JP | 1994-254422 A | 9/1994 |
| JP | H08-287910 | 11/1996 |
| JP | 2001-229914 | 8/2001 |
| JP | 2003-514753 A | 4/2003 |
| JP | 2004-511422 A | 4/2004 |
| WO | WO 2010/089326 A1 | 8/2010 |

OTHER PUBLICATIONS

Ong, T. S., and Yang, H., "Effect of atmosphere on the mechanical milling of natural graphite", Carbon, vol. 38, No. 15, Jan. 2000, pp. 2077-2085—XP-004217753.

Kuga, Y.; Shirahige, M.; Fujimote, T.; Ohira, Y., and Ueda, A., "Production of natural graphite particles with high electrical conductivity by grinding in alcoholic vapors", Carbon, vol. 42, 2004, pp. 293-300—XP-002540465.

Hayashi, Tsuyoshi; Saitou, Koji; Hasegawa, Takashi; and Tabata, Yujin, "Effects of Grinding Aids on the Surface Properties of Flaky Graphite", Journal of the Ceramic Society of Japan, vol. 104, 1996, pp. 215-220—XP-002540466.

Kohs, W.; Santner, H. J.; Hofer, F.; Schröttner, H.; Doninger, J.; Barsukov, I.; Buqa, H.; Albering. J. H.; Möller, K.-C.; Besenhard, J. O.; and Winter, M., "A study on electrolyte interactions with graphite anodes exhibiting structures with various amounts of rhombohedral phase", Journal of Power Sources, vols. 119-121, Jun. 2003, pp. 528-537—XP-004430226.

Chehab, S.; Guérin, K.; Amiell, J., and Flandrois, S., "Magnetic properties of mixed graphite containing both hexagonal and rhombohedral forms", The European Physical Journal B, vol. 13, 2000, pp. 235-243—XP-002540467.

Hassibi, Mohamad; Rogers, Kevin J.; and Yang, Margaret, "Advances in Fine Grinding & Mill System Application in the FGD Industry", Chernco Equipment Company, 1999, pp. 1-6.

Laine, N. R.; Vastola, F. J., and Walker Jr., P. L., "The Importance of Active Surface Area in the Carbon-Oxygen Reaction", Journal of Physical Chemistry, vol. 67, Oct. 1963, pp. 2030-2034.

Ström, Göran; Fredriksson, Monica, and Stenius, Per, "Contact Angles, Work on Adhesion, and Interfacial Tensions at a Dissolving Hydrocarbon Surface", Journal of Colloid and Interface Science. vol. 119, No. 2, Oct. 1987, pp. 352-361.

Probst, Nicolaus, and Grivei, Eusebiu, "Structure and electrical properties of carbon black", Carbon, vol. 40, 2002, pp. 201-205.

Hart, P. J.; Vastola, F. J., and Walker Jr., P. L., "Oxygen Chemisorption on well cleaned Carbon Surfaces", Carbon, vol. 5, 1967, pp. 363-371.

Brock, T.; Groteklaes, M.; and Mischke, P., "European Coatings Handbook" Chap. 4.9, Curt R. Vincentz Verlag, Germany 2000, pp. 231-245.

International Search Report and Written Opinion issued Mar. 30, 2010, in International Application No. PCT/EP2010/051314, filed Feb. 3, 2010.

Office Action issued in related Japanese Application No. 2011-546877, dated Jan. 14, 2014.

Office Action issued in related Japanese Application No. 2011-546877, dated Jan. 20, 2015.

Japanese Office Action for Japanese Application No. 2015-179786, dated Jun. 20, 2016 and English translation thereof (9 pages).

* cited by examiner

Figures 1a and b: Resistivity vs. Density Curve for HOGA Graphite Compared to Conventional Graphitic Material (SFG6) and Conventional Expanded Graphite Material (BNB90).

Figure 2: Mechanical Energy Applied to Increase the Density of HOGA Graphite (HOGA MK44) and Conventional Expanded Graphite (BNB90).
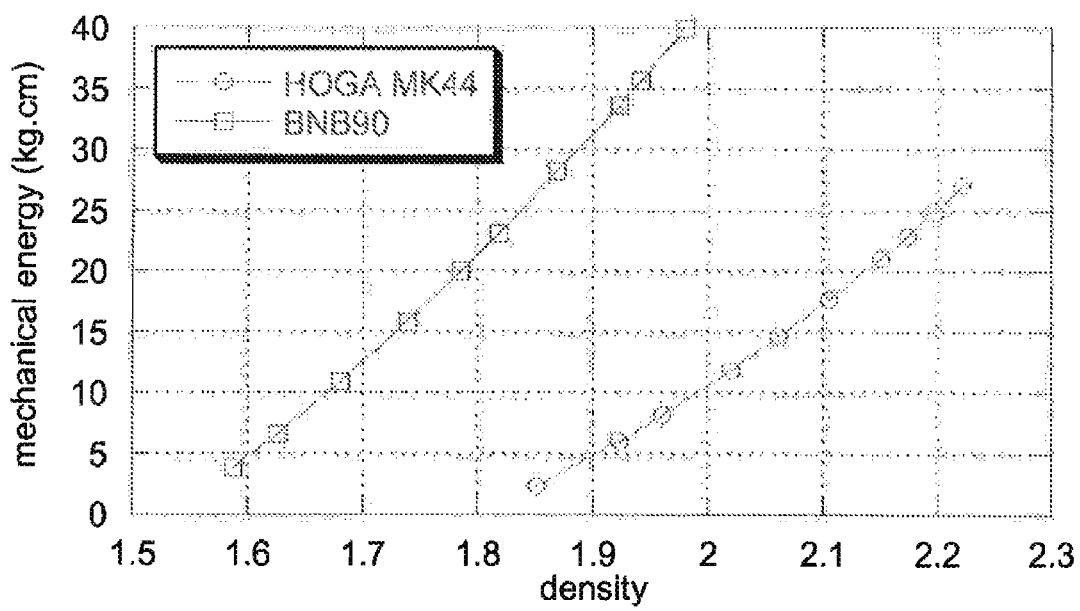

Figure 3: Specific BET Surface Area for HOGA Graphite and Conventional Graphite Types as a Function of the Average Particle Size ($d_{50}$).
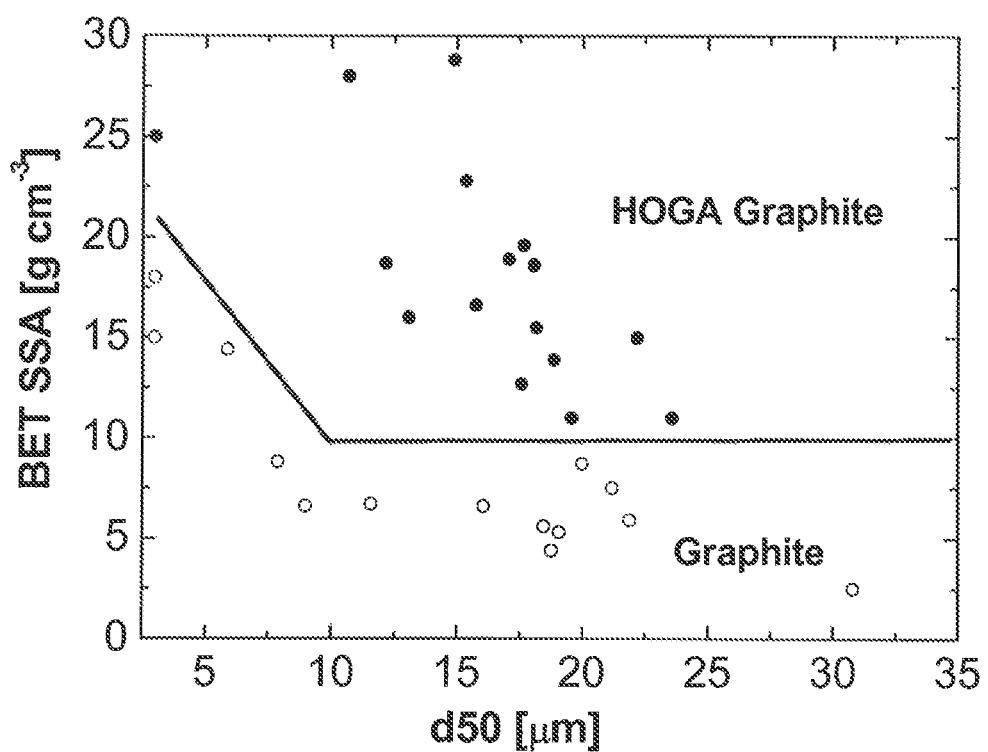

Figure 4 a and b: SEM of Commercially available TIMREX® MX44
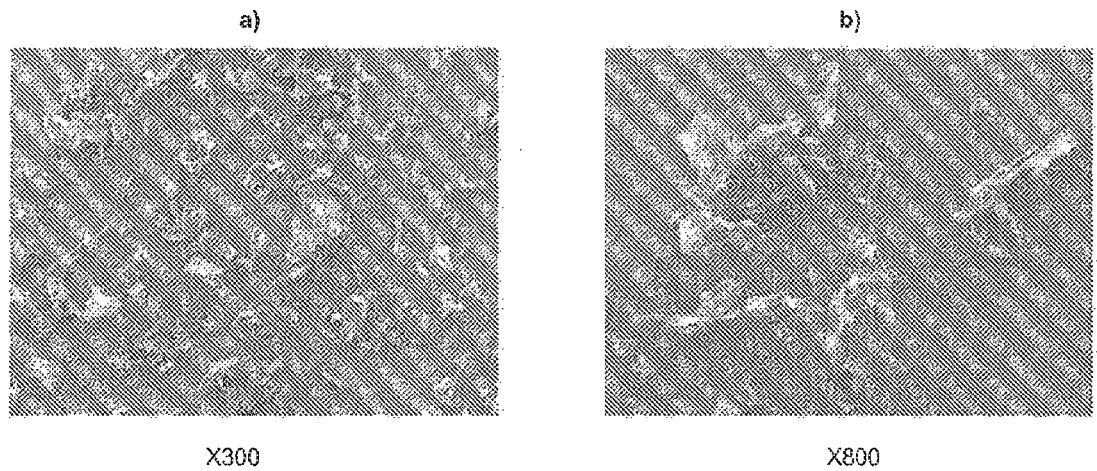
Figure 5 a to d: SEM of the Graphite Material of Figure 4 after Treatment in an Attrition Mill as Described in the Present Invention.
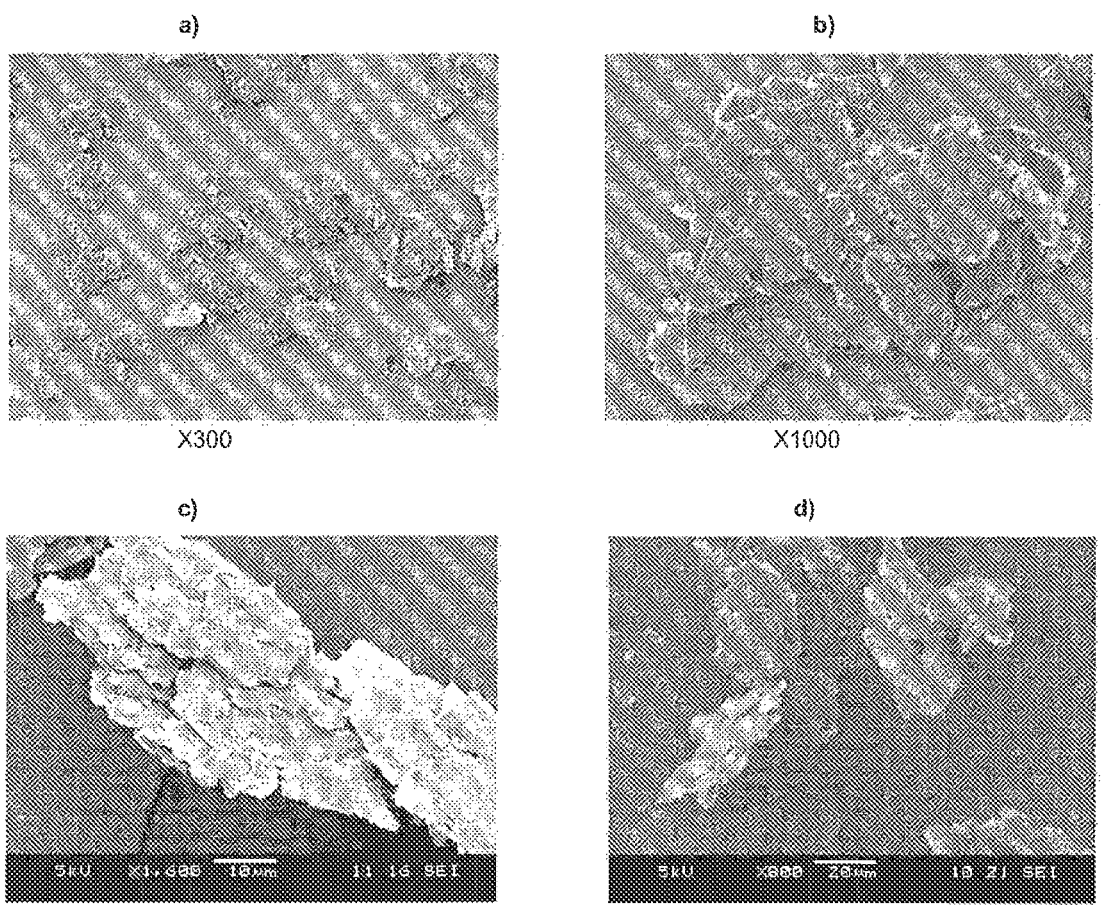

Figure 6: Schematic Showing the Equipment for the Resistivity/Density vs. Pressure Measurements.
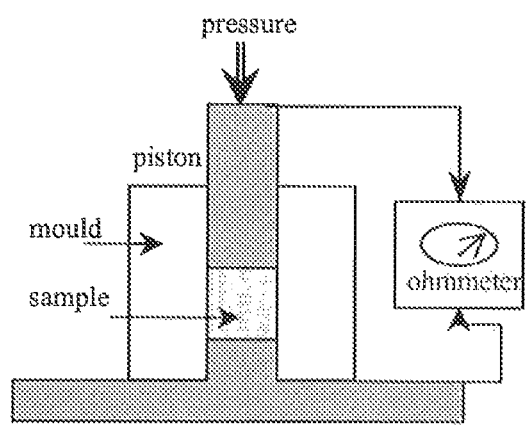

GRAPHITE MATERIAL

This application is a continuation of U.S. application Ser. No. 13/147,012, filed Dec. 9, 2011, which is a U.S. national stage entry under 35 U.S.C. §371 from PCT International Application No. PCT/EP2010/051314, filed Feb. 3, 2010, which claims priority to and the benefit of the filing date of EP Application No. 09151938.9, filed Feb. 3, 2009, and U.S. Provisional Application No. 61/149,369, filed Feb. 3, 2009, the subject matter of all of which is incorporated herein by reference.

FIELD OF THE INVENTION

The present invention provides a novel non-exfoliated graphite powder containing highly oriented grain aggregates (hereinafter referred to as "HOGA") having a new morphology and surface chemistry, as well as methods for the production thereof. The highly oriented grain aggregates are formed by graphite single crystals fused together in a highly oriented way to form stable anisometric aggregates representing the particles of the graphite material. The orientation of the graphite grains according to the invention in the aggregates in the xy-plane causes a strong anisotropy of graphite properties such as electrical and thermal conductivity. In addition, the high orientation of the graphite crystals provided herein causes high reflection of light leading to a shiny appearance of the material.

BACKGROUND OF THE INVENTION

In recent years the demand for new graphite materials with increased performance in many domains has created a need for new production technologies. For example, the development of graphite for anodes in Li-ion batteries and for use in coating dispersions has seen increased attention in this field.

Amongst these technologies, the grinding of graphite in ball mills has generally been described in the literature. Grinding in ball mills has been performed in both dry and liquid environments to decrease the particle size distribution of graphite down to micron or nano dimensions. Ball mill grinding in liquid medium is usually performed to produce colloidal dispersions. However, the mechanical treatment in a ball mill is typically not suitable to produce anisometric HOGA-like graphite as described in the present invention. Moreover, ball-milled graphite usually shows low electrical resistivity in the cathode.

Byoung et. al. (Kim, Byoung G.; Choi, Sang K.; Chung, Hun S.; Lee, Jae J.; Saito, F. Mining and Materials, Korea Institute of Geology, Daejon, Yoosung-ku, S. Korea. *Powder Technology* 2002, 126(1), 22-27) describe the grinding of graphite in a low-pressure attrition system. However, this treatment was performed in a dry attrition mill at reduced pressure and elevated temperatures and caused an unspecific reduction of the particle size down to nanometer dimensions. Due to the impact force of the dry attrition, the particles are delaminated and broken indistinctly into smaller parts, while in the HOGA process of the present invention the attrition, which is carried out in liquid medium, is mainly generating delamination. An extremely anisometric form of graphite like the HOGA graphite in the micrometer dimension has not been described by Byoung et. al.

Tsuji et al. (Tsuji, Nobuhiro; Sugimoto, Hisanori. (Nippon Graphite Industries Co., Ltd., Japan), U.S. Pat. Appl. No. 2006046146) mention a process to produce non-exfoliated graphite by peeling-off the graphite layers to produce extremely flaky graphite powders for alkaline battery cathodes. However, the process to peel-off the graphite layers is only described in a very unspecific manner and neither the use of a liquid medium nor an agglomeration of the particles is mentioned by the inventors. The resulting graphite product shows product properties that are clearly distinguishable from those of the HOGA graphite provided herein, in particular with regard to the surface properties. Moreover, the density and specific surface properties of the graphite materials described by Tsuji are shifted during the manufacturing process to decreased values, in contrast to the increase of those parameters during the manufacture of HOGA graphite as described in the present application.

Miura et al. (U.S. 2006/0147796 assigned to Nissan Motor Co., Ltd.) describe a process for making a ground positive electrode active material selected from manganese composite oxides, nickel composite oxides, and cobalt composite oxides. The essence of this invention appears to be the size reduction of the positive electrode active material with different mills such as a vibratory mill, ball mill or sand-mill, followed by the mixing with a conductive additive. Unlike in the present invention, no distinction is made between the effects achieved when different mills are used to prepare the ground material. Furthermore, the only mention of a carbon based material is for use as a conductivity enhancement additive (which has not undergone any form of dry or wet grinding prior to being used). Accordingly, HOGA graphite is neither described, prepared nor used in US 2006/0147796.

Graphite Preparation and Properties

The chemical structure of graphite single crystals is stacked layers of six-membered rings of carbon atoms. The graphite layers are bound together by weak van-der-Waals forces. The interlayer distance between these graphite layers ideally is 0.3353 nm. The hexagonally structured graphite phase, the thermodynamically stable polymorph, shows a stacking sequence of ABAB. Also, a rhombohedral stacking sequence of ABCA is found. Depending on the amount and dispersion of the rhombohedral stackings in the graphite crystal, they can be considered either as isolated rhombohedral phases or as stacking defects of the hexagonal structure. These rhombohedral stacking defects in the hexagonal structure are created by mechanical treatment of the graphite material (graphite milling). Electrical and thermal conductivity within the graphene layers are about 3 orders of magnitude higher than perpendicular to the graphene layers leading to a strong anisotropy of the electrical and thermal conductivity in the graphite crystal.

Usually graphite powders contain polycrystalline particles, i.e. graphite particles contain one or more single crystals which are grown together. Graphite particles have a platelet or flaky shape. Depending on the graphite type, these single crystals are more or less randomly oriented in the particle. The degree of alignment or random orientation gives the mosaicity of the graphite particles, which is a parameter used to describe the graphite texture. The graphite texture is one of the main parameters used to distinguish individual graphite materials and their properties.

Several graphite applications require graphite materials containing particles with high aspect ratio, i.e. with anisometric, flaky or needle-shaped particles. Graphite materials with anisometric particles show low apparent densities. Used as conductive components in electrical conductive masses, graphite materials show percolation thresholds at lower concentration the lower the apparent density is, i.e. anisometric graphites deliver low resistivities at low concentrations because of the higher volume of carbon at the same weight fraction. In addition, in the case of graphite materials with the same apparent density, the graphite materials with the higher aspect ratio (higher anisometric particle shape) exhibit the percolation at lower carbon concentration. The ideal graphite conductive additive in electrochemical electrodes has particles with high aspect ratio, in which large single crystal domains are oriented preferentially along the particle platelet plane combined with a low apparent density or, in other words, a high void volume.

Due to the anisotropy of the graphite structure and texture, mechanical treatments like grinding processes can influence the particle shape. The energy which is required to separate graphite single crystals of a particle and to cleave the graphite single crystals along the van-der-Waals layers is lower compared to the energy which is needed to cut a graphite single crystal perpendicular to the single crystals. Conventionally applied grinding processes like ball milling, air jet milling and mechanical milling techniques usually have a relatively high energy impact on the graphite materials. Thus, the grinding process is less specific for the resulting particle shape. These grinding techniques apply shear forces combined with shock forces with high energy impact to decrease particle size. Usually, they cleave the graphite particles and the graphite single crystals parallel and perpendicular to the xy-plane.

Accordingly, it is an object of the invention to provide novel graphite powders having superior properties compared to powders of the prior art. It is another object of the invention to also provide suitable processes for making such graphite powders.

SUMMARY OF THE INVENTION

The inventors have surprisingly found that graphite particles with a high aspect ratio can be prepared if high shear forces parallel to the platelet plane and along the graphene layers of the crystal grains are applied. It has been observed that a mechanical treatment in an attrition mill or agitator mill in liquid medium is an appropriate way to mechanically delaminate graphite crystals along the xy-planes of the graphite structure. To specifically delaminate graphite along the van-der-Waals layers, specific mechanical energy must be applied which cleaves graphite layers without breaking them.

The attrition mill mainly generates shear forces at relatively low energy. These shear forces isolate the single crystal domains of the particles and cleaves the single crystals along the van-der-Waals layers partially delaminating them. However, the transferred energy is not sufficient to cut the crystal grains perpendicular to these layers. In liquid media, the partially delaminated graphite crystals form stable chemically bonded aggregates being highly oriented alone the xy-planes.

Such a mechanical treatment according to the present invention yields a non-exfoliated graphite powder containing highly oriented grain aggregates (HOGA) having a new morphology and surface chemistry. HOGA graphite according to the present invention is characterized by its better conductivity at high density compared to untreated similar material. Furthermore, the high orientation of the graphite crystals provided herein causes high reflection of light leading to a shiny appearance of the material. On the structural level, the HOGA graphite of the present invention is generally characterized by the absence of rhombohedral peaks in the XRD pattern.

Accordingly, in one aspect the present invention provides a graphite powder containing highly oriented grain aggregates [HOGA], wherein the fraction of rhombohedral crystallinity is less than 10%, or less than 5%, or less than 2%, or where substantially no rhombohedral stacking is present, and having a loss of at least 15% by weight as measured by thermogravimetric analysis (TGA) at temperatures below 730° C., preferably below 720° C., more preferably below 710° C., and most preferably at temperatures below 700° C.

In some embodiments, the graphite powders of the invention are characterized by decreasing electrical resistivity with increasing density. Preferably, the electrical resistivity of the HOGA powder can decrease between 10 and 40% in the density range between 1.5 and 1.8 g/cm$^3$, or between 20 to 40% in the density range between 1.5 and 1.8 g/cm$^3$, or between 30 to 40% in the density range between 1.5 and 1.8 g/cm$^3$. Alternatively, the electrical resistivity of the HOGA powder can decrease between 10 and 40% in the density range between 1.8 and 2.1 g/cm$^3$, or between 20 to 40% in the density range between 1.8 and 2.1 g/cm$^3$, or between 30 to 40% in the density range between 1.8 and 2.1 g/cm$^3$.

In a further embodiment, the graphite powder according to the invention shows an average particle size ($d_{50}$) in the range between 10 and 50 micron, and a BET surface area of higher than 10 m$^2$/g.

In other embodiments, the graphite powder according to the invention shows an average particle size in the range between 5 and 10 micron, and a BET surface area of higher than 15 m$^2$/g.

In yet other alternative embodiments, the graphite powder according to the invention shows an average particle size between 1 and 5 micron, and a BET surface area of higher than 25 m$^2$/g.

In some embodiments, the graphite powder according to the invention shows a crystal size in the crystallographic c-direction (Lc) of larger than 10 nm.

Preferably, the graphite powder according to the invention shows a spring-back of lower than 10%.

In another aspect, the present invention provides a process for obtaining the highly oriented grain aggregates graphite powder as defined above, wherein the starting graphite powder is a natural and/or synthetic graphite carbon, characterized in that the starting graphite powder is mechanically treated in a suitable mill, preferably an attrition mill, an agitator mill or a sand mill. In the presence of a liquid medium.

The mechanical treatment is preferably performed until the intensity of the I(002) peak of the XRD spectrum is increased by a factor of 1.5, preferably 2, more preferably 3, compared to the starting material.

In certain embodiments, the treatment in the attrition mill or agitator mill is performed in the presence of beads having a diameter in the range from 0.1 to 3 mm.

The liquid medium for performing the process f the invention preferably comprises water, or an organic solvent, or mixtures thereof.

In some embodiments of this aspect of the invention, the process further comprises the step of removing the liquid medium.

Yet another aspect of the present invention is an electrode containing the graphite powder of the present invention. Preferably, the electrical resistivity in the electrode containing a graphite powder according to the present invention is at least 20% lower than for comparative untreated graphite material at a concentration of 5% of the graphite powder.

Furthermore, the present invention provides a coating dispersion comprising the graphite powder of the invention dispersed in a liquid medium. The liquid dispersion medium may comprise water.

In addition, the present invention provides a battery comprising the graphite powder according to the invention as defined above.

The present invention also provides a compressed body of pure graphite, wherein the graphite body has been made from HOGA graphite powder as defined above.

In yet another embodiment, the HOGA graphite powder of present invention is used as lubricant in hot metal forming processes.

BRIEF DESCRIPTION OF THE FIGURES

FIG. 2 illustrates the mechanical energy applied to increase the density of HOGA graphite (HOGA MK44) and conventional expanded graphite (BNB90).

FIG. 3 shows the specific BET surface area for HOGA graphite and conventional graphite types as a function of the average particle size ($d_{50}$).

FIGS. 4a and b show scanning electron microscope (SEM) pictures of the commercially available prior art graphite TIMREX® MX44 at 300-fold and 800-fold magnification.

FIGS. 5a to d show scanning electron microscope pictures of the graphite material of FIG. 4 after treatment in an attrition mill as described in the present invention.

FIG. 6 shows a schematic illustration of the equipment for the resistivity/density vs. pressure measurements.

DETAILED DESCRIPTION OF THE INVENTION

Figure 1A:
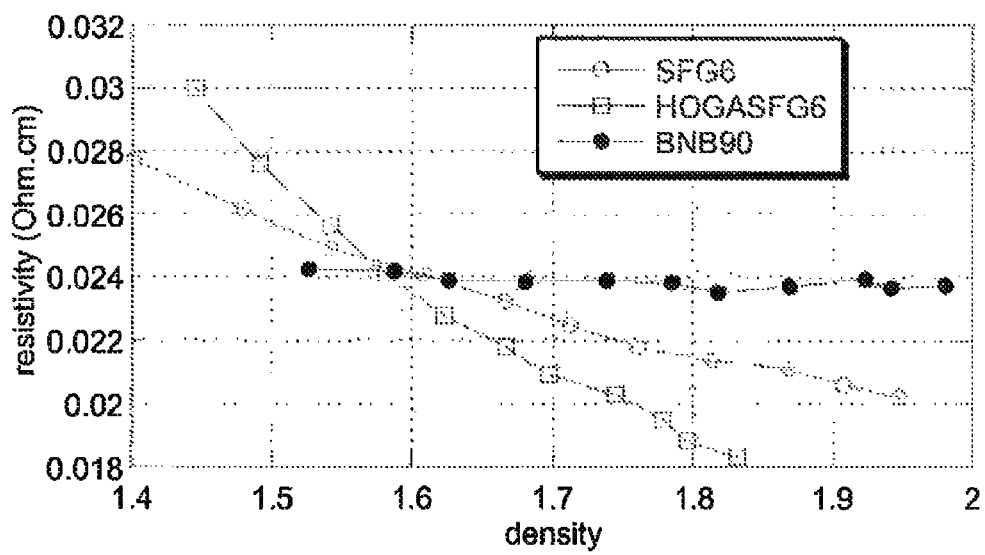
FIGS. 1a and b show the resistivity vs. density curve for HOGA graphite (HOGASFG6; HOGA MK44) compared to conventional graphite material (SFG6) as well as conventional expanded graphite material (BN890) known from the prior art.

It has been found by the present inventors that HOGA graphite can be obtained by a special mechanical treatment of graphite powders by applying high shear energy in liquid media. HOGA graphite according to the present invention can be derived from a synthetic or natural source of graphite.

The high shear forces disperse the raw graphite powder in the liquid medium used and partially isolate individual graphite grains from the raw graphite particles. In addition, the graphite crystals partially delaminate along the graphite layers (being perpendicular to the crystallographic c-axis and bound together only by weak van-der-Waals forces). In the liquid medium, the delaminated graphite crystals recombine under the influence of the shear forces forming aggregates of highly oriented flaky graphite grains. The size and shape of the aggregates can be varied by the shear energy transferred to the graphite particle, by the treatment time, and by the type of the liquid medium used for the process. The mechanical treatment could be performed in any suitable mill such as an attrition mill or an agitator mill. Typical liquid media used can be water or organic solvents. The HOGA graphite can be recovered from the liquid dispersion by drying or it can be directly applied in liquid dispersion.

HOGA graphite shows a high degree of crystallinity. Interlayer distances between the graphite layers (C/2) typically range between about 0.3353 nm to about 0.3370 nm; the crystal size in the crystallographic c-direction (Lc) is preferably equal to or larger than 10 nm. The isolated HOGA graphite typically has an average particle size below 50 micron. Compared to conventional natural or synthetic graphite powder, HOGA graphite shows a significantly increased specific BET surface area and is free of rhombohedral stacking defects. Conventional synthetic and natural non-exfoliated graphite materials with average particle size between 10 and 50 micron show specific BET surface areas below 10 $m^2/g$. In contrast, HOGA graphite powders provided herein with average particle sizes of 10-50 micron shows specific BET surface areas above 10 $m^2/g$. In the case of finer average particle sizes in the range of 5 to 10 microns, conventional non-exfoliated graphite shows specific BET surface areas below about 15 $m^2/g$, while in a size range of 1-5 microns, conventional non-exfoliated graphite shows specific BET surface areas of at least below 20 $m^2/g$. In contrast, HOGA graphite having an average particle size of 1-5 microns shows specific BET surface areas of 25 $m^2/g$ up to 50 $m^2/g$ (cf. FIG. 3).

The thermodynamically stable phase of graphite is the hexagonal phase. By applying mechanical treatments like a typical milling process to the graphite material, rhombohedral stacking defects are created. Depending on the dispersion degree of the rhombohedral stacking defects in the material, these rhombohedral stacking defects can segregate to isolated rhombohedral phases in the graphite material. Usually, mechanically treated (ground) graphite materials contain a sizeable fraction of rhombohedral defects. These stacking defects can be cured by heat treatment significantly above 1000° C. in an inert atmosphere. In this case the material specific surface area and the chemical reactivity are reduced. HOGA graphite is characterized by an increased sensitivity to reactive chemicals as measured by ASA and by the lower temperature at 15% weight loss under oxygen atmosphere in a TGA experiment. Rhombohedral stacking defects surprisingly vanish from the graphite raw powder during the preparation of HOGA graphite. HOGA graphite is a mechanically treated high crystallinity graphite wherein the fraction of rhombohedral crystallinity is less than 10%, or less than 5%, or less than 2%, or which does not exhibit any substantial rhombohedral stacking defects. In addition HOGA graphite shows spring-back of below about 10% and good compressibility. HOGA graphite has high electrical and thermal conductivity as well as low friction coefficients. The high aspect ratio of the particles leads to excellent conductivities if mixed with active material and compressed in electrodes of electrochemical systems. Electrode masses of electrochemical storage systems containing HOGA graphite as a conductivity enhancer show significantly decreased electrical resistivities of the electrode at low graphite concentration.

HOGA graphite dispersed in liquid media can be used as starting pigment concentrate for coating dispersion. Using water as dispersion media, aqueous coating dispersions can be formulated. Besides the HOGA pigment, such aqueous coating dispersions contain additives like dispersants to stabilize the pigment, colloidally dispersed polymers as binding agents, surfactants as wetting agents, as well as rheological additives as thickeners. Dried layers of delaminated graphite prepared from the coating dispersions of the invention show lower electric and thermal film resistivity than layers formed by untreated graphite materials, as well as decreased friction coefficients.

Figure 1B:
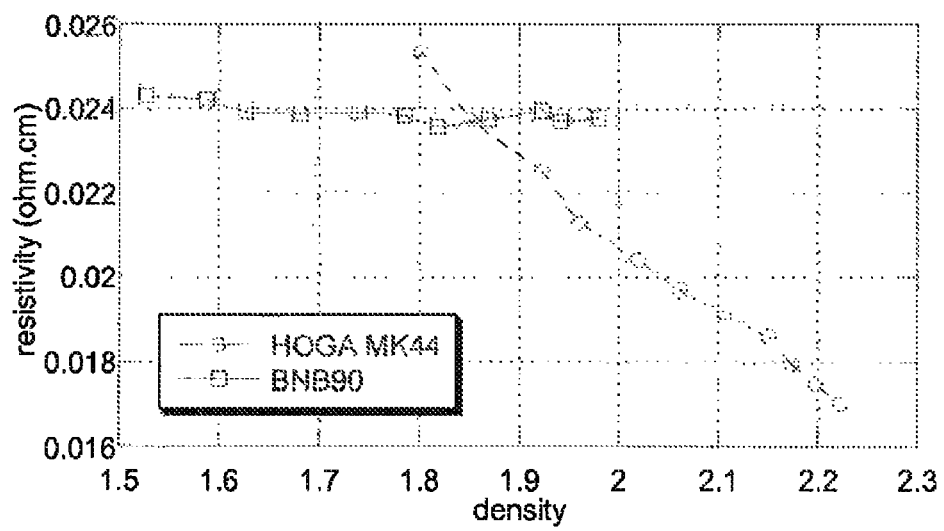

So far, an ideal cleavage of the particles along the van-der-Waals layers has only been achieved in the prior art by a chemical treatment and subsequent thermal treatment. In this case, typically acid molecules are intercalated between the graphite layers. In a subsequent thermal treatment step, the intercalated molecules are decomposed forming gases that cleave the particles and exfoliate the graphite layers, forming exfoliated graphite. However in the case of exfoliated graphite, particle cleavage is done in a complicated chemical and subsequent thermal process. Expanded graphite, although showing a low bulk density, is characterized by a conductivity which is essentially constant over a very broad density range, while conductivity increases for all other graphites and carbon powders when the density increases [1] (see FIG. 1). Expanded graphite has also a $T_{15\%}$ (temperature at 15% weight loss) above 730° C. HOGA graphite is produced by a mechanical treatment leading to extremely anisotropic texture. HOGA graphite cannot be considered as exfoliated or expanded graphite.

To specifically delaminate graphite along the van-der-Waals layers, specific mechanical energy must be applied which cleaves graphite layers without breaking them. It was found that a mechanical treatment in an attrition mill or agitator mill is an appropriate way to mechanically delaminate graphite crystals along the xy-planes of the graphite structure. In this process, graphite particles are mechanically treated in a liquid medium like water, organic solvents, or mixtures thereof. The attrition mill disperses the particles in the liquid medium. The partial delamination of the graphite grains is combined with a recombination with high orientation along the platelet plane. The process results in highly anisometric graphite particle shapes.

The specific energy input for the HOGA treatment is dependent from the equipment used, but ranges typically from about 6 to about 15 MJ/kg of graphite for a small lab equipment. For larger milling equipments, the values may deviate, since there is no predicable correlation between the energy input and the load of the milling equipment. Rather, the energy input is influenced by the design of a specific milling equipment. Consequently, the above values should be understood as a guidance only, and are not intended to be limiting.

In contrast to the conductivity in mixtures, the intrinsic electrical and thermal conductivity of graphite in part depends on the interlayer distance of the graphite layers and on the size of the single crystals. The larger the single crystalline domains, the higher are the electrical and thermal conductivity values. Usually, larger crystals have a higher tendency to take an oriented position along the particle platelet plane leading to a stronger anisotropy of the electric and thermal conductivity. Usually, graphite materials with such a graphite texture show increased conductivity and lower friction coefficients.

The spring-back of a graphite material after releasing the compression force is influenced by the crystallinity, graphite texture, particle size, and surface properties. The graphite spring-back has an influence on the mechanical stability of pressed graphite bodies or pressed bodies of graphite mixtures with other minerals, such as, e.g., cathodes for batteries.

Description of the Preparation Process

Attrition mills or agitator mills are known [2], [3], [4], [5]. They are commonly used to incorporate pigments or fillers in a liquid phase. Attrition mills break down pigment agglomerates (agglomeration of primary particles or crystallites, or aggregates) to primary particles and distribute them in a liquid phase to form homogenous dispersions of the pigment in the liquid phase. Attrition mills contain beads that act as grinding media. The beads are set in translational and rotational movement. As a result, they impact both against one another and against the walls and other surfaces in the grinding compartment. Compressive stress and shear forces are generated. Grinding media in attrition mills usually are beads with diameters in the range from 0.1 to 3 mm which are made from materials such as steel, zirconium oxide, aluminium oxides, Si/Al/Zr mixed oxides, steatite, glass and plastic. Whereas the traditional ball mill comprises a rotating horizontal closed cylinder partially filled with larger balls and material to be treated, in an attrition mill the vessel is at rest and the mixture, consisting of smaller balls and material to be dispersed, is kept moving by a rapidly rotating stirring element. The harder the beads of the attrition mill, the greater is the intensity of the dispersion as well as the attrition effect on the graphite particle surface. The density of the beads in the mill has little influence on the graphite surface activation. The smaller the bead size, the larger the shear forces in relation to the shock forces transferred from the mill to the ground graphite material. Thus, the difference of an attrition mill process to the conventional ball mill process usually being applied to grind graphite and to disperse graphite particles in liquid media is the energy impact on the graphite particles. Ball mills usually transfer higher shock energy to the graphite particles which leads to a more unspecific breakage of the graphite particles. The larger the balls, the more shock energy can be transferred from the mill to the graphite material. In general, mechanical treatment in a ball mill leads to more isotropic particles and increased apparent densities. As a consequence, the more energy-intensive ball mill treatment usually leads to a deterioration of the electrical properties of the graphite material used as a conductive additive in the electrode. Usually ball mills have a larger energy impact on the material to be grinded. The large balls and mill geometry result in high shear and shock forces that break graphite particles, leading to a deterioration of the graphite properties.

It was found that for natural and synthetic graphite materials, the energy impact of an attrition mill or agitator mill is sufficient to break down agglomerates of graphite particles and to disperse them homogeneously in the liquid medium. In addition, high shear forces are generated between the beads being covered by graphite dispersion films. These high shear forces separate the graphite single crystal grains (primary grains) and cleave the crystal grains along the graphite layers leading to the delamination of the graphite crystals. However, the energy impact of the mechanical treatment is not enough to break the primary grains perpendicular to the graphene layers or to change their shape. Combined with the delamination process, the delaminated graphite grains recombine to form stable, chemically bonded aggregates which are highly oriented. The HOGA graphite powder thus obtained can be recovered from the liquid dispersion by a simple drying process or can be applied directly from the liquid dispersion.

Properties of HOGA Graphite

HOGA graphite can be described as non-expanded highly anisotropic graphite material with high crystallinity and extremely flaky particle shape. The particle morphology is generated by thin single crystals highly oriented along the xy-plane of the particle. HOGA graphite can be obtained from conventional non-expanded graphite powder by the dispersion of the crystalline grains in a liquid medium, partial delamination of the graphite grains, and subsequent agglomeration of the cleaved grains to stable highly oriented aggregates. This can be achieved by mechanical treatment in a suitable mill, such as an attrition mill or an agitator mill or a sand mill. The particle aggregates are stable and cannot be cleaved by ultrasonic treatments unless very high energies of above about 400 Wh are applied. The high orientation of the grains in the anisometric aggregates causes a high optical reflection of light leading to a shiny, brilliant appearance of the material. The crystallinity of the graphite is not substantially affected by the mechanical treatment.

HOGA graphite differs from expanded graphite in its electrical behaviour. Expanded graphite is known to have a flat evolution of the resistivity in function of the pressure applied, while other graphites and especially HOGA graphite exhibit an increasing conductivity with increasing density resulting from applying increased pressure [1]. FIG. 2 shows the mechanical energy required to increase the density of HOGA and conventional expanded graphite. This could be explained by the increasing electronic density with pressure in the direction of the applied pressure in the case of the HOGA and other graphites, as opposed to the expanded graphite where no electronic density increase is observed. The test procedure is described in the experimental section below.

HOGA graphite is a highly crystalline graphite material typically having high c/2 (0.3353 to about 0.3370 nm) and Lc values (larger than 10 nm). The crystallinity of the starting graphite is substantially maintained during the manufacturing process: However, the rhombohedral diffraction peaks vanish during the mechanical treatment, indicating that HOGA graphite is a strictly hexagonal phase. This can be considered as unique because commonly mechanically treated graphite materials with high crystallinity reveal a certain number of rhombohedral stacking defects. The average particle sizes of HOGA graphite preferably range between about 1 and about 50 micron.

The arrangement of the partially delaminated graphite grains in the HOGA graphite of the invention increases the fraction of basal planes to the detriment of the prismatic surfaces of the graphite material. This is determined by surface tension measurements of the graphite surface: The free surface energy of the treated graphite materials measured by the Washburn sorption method [6] decreased during the mechanical treatment. The polar fractions decreased whereas the unpolar fractions of the surface energy increased by the mechanical treatment.

Compared to conventional non-exfoliated graphite, specific BET surface area of HOGA graphite is increased. The specific BET surface area is higher the greater the residence time of the graphite in the attrition mill—due mainly to the delamination and aggregation process in the liquid medium. Conventional synthetic and natural non-exfoliated graphite materials with average particle size between 10 and 50 micron show specific BET surface areas significantly below 10 $m^2/g$. HOGA graphite powders with average particle sizes of 10-50 micron have specific BET surface areas above 10 $m^2/g$. In the case of finer average particle sizes of 1-10 micron, conventional non-exfoliated graphite shows specific BET surface areas below 20 $m^2/g$. In contrast, HOGA graphite shows specific BET surface areas of 25 $m^2/g$ up to 50 $m^2/g$.

The change in surface chemistry of the HOGA treated material is also confirmed in the temperature at 15% weight loss under air atmosphere in TGA equipment ($T_{15\%}$), as shown in Table 1 below.

TABLE 1

Temperature at 15% weight loss of treated and-non-treated graphite samples, compared with conventional expanded graphite samples, in TGA experiment under air atmosphere.

| Sample Code | $T_{15\%}$ Before Treatment | $T_{15\%}$ After Treatment |
|---|---|---|
| MK44 | 787 | 687 |
| SFG6 | 729 | 672 |
| ME-44 | 746 | 683 |
| MX-44 | 798 | 730 |
| KS-44 | 762 | 694 |
| SFG75 | 799 | 734 |
| MX-25 | 802 | 705 |
| KS-6 | 763 | 657 |
| KS-75 | 789 | 712 |
| BNB90 (Expanded) | 730 | |
| Expanded not ground | 750 | |

Compared to non-HOGA-treated graphite materials, the temperature at 15% weight loss under air atmosphere in TGA equipment ($T_{15\%}$) is frequently decreased by at least 60° C., The maximum decrease of $T_{15\%}$ yet observed was 110° C.

X-ray photoelectron spectroscopy of the treated material showed a slight increase of O(1 s) intensity, indicating a small increase of the surface oxides. The crystallinity in the surface-near regions of the particle slightly decreases, while the concentration of surface defects and carbon disorder slightly increases by the treatment. Raman spectroscopy showed a small increase of the D-band intensity in relation to the intensity of the G-band indicating a decrease of the correlation length $L_a$ as well as the superficial crystallinity.

The increase of superficial defects is accompanied by a significant increase of the active surface area and increase of active surface sites measured by chemisorption of oxygen and subsequent temperature-controlled thermodesorption according to Walker et al [7]. The increased surface defect concentration contributes to the increased specific BET surface area observed during the treatment. The change in surface chemistry of the HOGA treated material is also confirmed in the temperature at 15% weight loss under oxygen in TGA equipment.

The particular texture and surface morphology combined with the high crystallinity of HOGA graphite as well as the specific electrical behaviour under pressure may explain the low spring-back. The low spring-back could be due to a reduction of coulombic repulsion forces, imparting also a better conductivity even in most cases at lower density.

The low spring-back is the reason for the high density and excellent mechanical stability of compressed HOGA graphite bodies, showing almost 50% increase in flexural strength compared to conventional graphite materials. For synthetic graphite materials, the spring-back decreases to a larger extent than for natural graphite. According to the inventor's knowledge, the spring-back values achieved for both synthetic and natural based graphite flakes are among the lowest which have ever been observed for graphite powders. The low spring-back values observed after the mechanical treatment is considered to be the explanation for the strong increase of the mechanical stability of pressed bodies consisting of pure graphite or graphite blended with other materials. The low spring-back values also indicate a good inter-particle contact between the pressed graphite particles, causing decreased contact resistance and therefore decreased electrical resistivities of the compressed graphite bodies.

The increase of the bulk and tapping density which is usually observed for the HOGA graphite compared to the related raw graphite material seems to contradict the increase of anisometry of the particle shape and aspect ratio. However, the particle size distribution and the amount of fine fraction are decreased, compensating and exceeding the effect of anisometry with regard to the apparent density of the final material. The same explanation seems valid for the decrease in oil absorption: The increase in particle anisometry causes an increase of oil adsorption. This effect is outperformed by the increase of the particle size distribution which decreases oil absorption of graphite.

The morphology of HOGA graphite gives rise to higher lubricity. HOGA graphite exhibits advantages as a lubricant for hot metal forming processes. In addition, it shows advantages in carbon brushes. With respect to synthetic graphite, the HOGA materials show increased electrical conductivity, higher electrical anisotropy, higher mechanical strength. The increased electrical anisotropy is in line with the overall increase of the physical anisotropy. Representative values for the above parameters are given in Table 2.

TABLE 2

Representative parameters for HOGA graphites and corresponding starting materials

| | density | Resistivity in plane $\rho xy$ mOhm · cm | Resistivity thru plane $\rho z$ mOhm · cm | anisotropy $\rho z/\rho xy$ | Flexural modulus N/mm2 |
|---|---|---|---|---|---|
| KC 44 | 3.484 | 3.96 | 26.1 | 6.6 | 24.41 |
| KC 44 Hoga | 3.498 | 2.66 | 27 | 10.16 | 28.34 |
| KS 44 | 3.412 | 5.27 | 30.16 | 5.72 | 19.07 |
| KS 44 Hoga | 3.468 | 3.15 | 26.66 | 8.47 | 26.41 |

Summary of HOGA Graphite Properties

| | Crystal structure |
|---|---|
| Interlayer distance c/2 | 0.3353-0.3370 nm |
| Crystal size Lc | >10 nm |
| Rhomb. fraction | less than 10%, preferably less than 5%, more preferably less than 2%, most preferably about 0% |
| | Texture |
| Xylene density | 2.23-2.27 g/cm$^3$ |
| Spring back | ≤10%; preferably ≤8.5%; more preferably ≤8% |
| BET SSA | ≥10 m$^2$/g; preferably ≥15 m$^2$/g; more preferably ≥20 m$^2$/g |
| Average particle size | <100 microns. |

Advantages of HOGA Graphite in Technical Applications

The product resulting from the mechanical treatment in the attrition mill is graphite powder dispersed in water or organic solvent. This product can be used as starting material for liquid graphite coatings. Attrition-milled aqueous graphite dispersions being mixed with selected dispersants, wetting agents, colloidal emulsions or dispersions of polymeric binder materials, and rheological additives form conductive dry coatings. Dry coating layers of such dispersions show improved electrical and thermal properties. Applied as primer on the metal current collector of an electrochemical cell, a thin coating of a graphite dispersion containing a HOGA graphite pigment treated in an attrition mill in the presence of water showed a lower surface resistivity leading to a decrease of the internal resistance of the electrochemical cell.

The dry graphite powder can be recovered from the graphite dispersion by a conventional drying process. Graphite bodies or graphite layers containing HOGA graphite show significantly increased electrical conductivities and mechanical stabilities compared to conventional graphite materials. Applied as conductivity enhancer in mixtures with other materials like active electrode materials of electrochemical storage systems like batteries, compared to conventional graphite. HOGA graphite achieve the same conductivity values at lower graphite concentration. Applied as conductive additives in the positive or negative electrode of an electrochemical cell, HOGA graphite show decreased electrode resistivities compared to the untreated graphite powders, leading to a decreased internal resistance of the electrochemical cell. Compressed bodies of pure HOGA graphite as well as blends with other materials show higher mechanical stabilities compared to compressed bodies containing conventional graphite additives at the same concentration.

By definition, an electrochemical cell consists of two electrodes separated by an electrolyte which represents a pure ion conductor. If the electrical conductivity of the electrode materials in the electrodes is not sufficient, graphite powders can be used as conductivity enhancers to decrease the resistivity of the electrodes in the cell. Both electrodes are contacted by current collectors which function as electronic leads in the cell. Thin graphite films on the metal current collectors improve the contact between the electrode and the current collector. In addition, the graphite film also have anti-corrosion effects. Chemical or electrochemical corrosion of metal current collectors usually lead to highly resistive films on the current collectors which increase the internal resistance of the cell during operation and storage of the electrochemical system. Since this corrosion preferably occurs during storage of the charged cell at elevated temperatures, a coating on the current collectors will improve the storage properties of an electrochemical cell.

For example, in known zinc manganese dioxide alkaline batteries, a pressed mixture of electrolytic manganese dioxide (EMD), graphite, KOH electrolyte and some additional additives form the positive electrode (cathode). Due to the relatively low specific conductivity of the manganese dioxide particles, the graphite material improves the electronic conductivity of the positive electrode. The manganese dioxide is the electroactive component in the electrode. Therefore it is important that the ratio of manganese dioxide to graphite within the given volume of cathode is optimized. An increasing volume of graphite reduces the battery capacity and consequently the energy density of the battery, but reduces the internal resistance of the battery and vice versa a reduced volume of graphite increases the battery capacity and the energy density of the battery, but increases the internal resistance of the battery. Thus, graphite powder which is applied as conductive additive in the electrode of electrochemical cells preferably should provide high conductivities at low concentrations in the mixture with the electroactive component. In addition, in the case of compressed electrodes, the graphite material which has binding properties should give a sufficiently high mechanical stability in the electrode. This is especially important in electrodes containing only a small quantity of graphite material which is optimised with regard to electrode resistivity. Compared to conventional graphite, HOGA graphite allows lower concentrations of conductive additive in electrodes for achieving the same electronic resistivities. At the same time, due to the improved binding properties of HOGA graphite compared to conventional graphite, it provides sufficiently high mechanical stability to the cathode ring even at low graphite concentration. Compared to conventional graphite, the electrical resistivity of electrodes containing HOGA graphite typically decreases by about 30-80%. The transversal rupture strength improves by about 20-60% depending on the graphite type. The decreased spring-back of HOGA graphite compared to conventional graphite gives advantages in processing, e.g. in the compaction process of alkaline battery cathode rings as well as in the ring moulding and impaction moulding process of alkaline battery production.

In the alkaline battery, the EMD/graphite cathode is contacted to the battery can which functions as current collector. In case of batteries containing low graphite concentrations in the cathode, the inner surface of the alkaline battery can which is in contact to the cathode is coated with a thin layer containing mainly a fine graphite powder. This coating improves the contact between the cathode and the current collector leading to a lower contact resistance. Moreover, the coating functions as anti-corrosion layer which suppresses the oxidation of the battery can surface by the corrosive manganese dioxide being in direct contact to the inner can surface. The oxidation layer formed on the inner can surface leads to an increased internal cell resistance especially during battery storage. The improved contact between cathode and battery leads to a decreased cell resistance, an important consideration for high power batteries. A can-coating is necessary in alkaline batteries working with a high EMD/graphite ratio due to a higher concentration of EMD at the can-to-cathode interface leading to high contact resistance and an increased oxidation rate. Batteries with a can coating containing HOGA graphite show lower battery resistances compared to coatings containing conventional graphite products.

In known lithium-ion batteries, graphite can be used as conductive additive in both electrodes in order to decrease the resistivity of the cell. The lower the concentration of the conductive additive being needed for a sufficiently low resistivity of the oxide electrode, the higher becomes the electrode capacity leading to high energy densities of the cell. A graphite coating on the copper current collector of the negative electrode and the aluminium foil of the positive electrode can improve, the contact between the current collector metal foils and the film electrodes, avoid corrosion effects on the metal current collectors, and thus ensure decreased internal cell resistances. HOGA graphite leads to advantageous lithium-ion batteries, used as both a conductive additive in the positive and negative electrodes and in the coating on the metal foil current collectors.

A thin layer of graphite on the metal-based bipolar plates, functioning as current collectors in fuel cells, improves the contact between the bipolar plates and the gas diffusion electrodes. Also, the corrosion of the metal-based bipolar plates, a disadvantage of such systems in comparison to bipolar plates based on graphite/resin-composites or impregnated graphite foils, can be decreased by applying a graphite primer on the metal plates. A coating of HOGA graphite on the metal bipolar plates provides lower internal resistances in fuel cells compared to coatings containing untreated graphite powder.

A decreased contact resistance as well as a decreased corrosion effect is also the reason to apply a thin graphite film on the aluminium foil current collectors of electrolyte capacitors (super capacitors or ultra capacitors). These aluminium foils are the electronic leads for the carbon-based electrodes which may contain a graphite additive as a conductivity enhancer.

Aqueous conductive coatings of HOGA graphite provide maximum performance in conductivity if optimum binders are used to achieve good adhesion on the substrate and cohesion of the film. Preferred aqueous binder dispersions are aliphatic and aromatic polyacrylates, aliphatic and aromatic polyurethanes, styrene butadiene co-polymers, styrene acrylate butadiene ter-polymer lattices, aliphatic and aromatic polyvinyl acetates, and aliphatic polyacrylo nitriles. Particularly good results can be obtained with polystyrene acrylate co-polymers and polyurethanes. Preferred wetting agents are n-alkyl polyethylene oxide or polyethylene glycol or iso-alkyl polyethylene oxide or polyethylene glycol, and the like.

An example of a conductive coating dispersion according to the present invention has the following composition:
10-40 wt. % of HOGA graphite
1-10 wt. % alkyl polyethylene glycol dispersant
0.1-0.5 wt. % trialkylamine or ammonia
5-40 wt. % aliphatic and aromatic polyacrylates, aliphatic and aromatic polyurethanes, styrene butadiene co-polymers, styrene acrylate butadiene ter-polymer lattices, aliphatic and aromatic polyvinyl acetates, and aliphatic polyacrylonitriles, polystyrene acrylate, or polyvinyl pyrolidinone binding agent
0.5-5 wt. % polyacrylic acid thickening agent
10-85 water

LITERATURE

[1] N. Probst, E. Grivel; Carbon 40 (2002) 201
[2] T. Brock, M. Groteklaes, P. Mischke, European Coatings Handbook, U. Zoril (Editor), Chapter 4.9, Curt R. Vincentz Verlag, Hannover, Germany (2000).
[3] N. Stehr, U.S. Pat. No. 6,460,791 B1, United States Patent (2002).
[4] N. Stehr, U.S. Pat. No. 5,897,068, United States Patent (1999).
[5] K. J. Rogers, M. Hassibi, M. Yang, EPRI-DOE-EPA Combined Utility Air Pollutant Control Symposium, Atlanta, Ga., USA (1999).
[6] G Ström, M. Frederiksson, P. Stenius J. Coll, Interf. Sci., 10 119/2, 352-361
[7] N. R. Leine, F. J. Vastola, P. L. Walker Jr., J. Phys. Chem., 67 (1963) 2030-2034, P. J. Harat, F. J. Vastola, P. L. Walker Jr., Carbon, 5 (1967) 363-371.

Experimental Section
Measurement Methods
Interlayer Spacing c2

The interlayer space c/2 is determined by X-ray diffractometry. The angular position of the peak maximum of the (002) and (004) reflection profiles are determined and, by applying the Bragg equation, the interlayer spacing is calculated (Klug and Alexander, X-ray diffraction Procedures, John Wiley & Sons Inc., New York, London (1967)). The graphite sample is mixed with a silicon standard. A mixture with polyglycol and ethanol is added to obtain a highly viscous slurry. Subsequently, a thin layer of approx. 150 mm is applied to a glass plate and dried. A Cu Ka X-ray beam is used.

Crystallite Size Lc

Crystallite size is determined by interpretation of the (002) and (004) diffraction profiles. However, the analysis is somewhat problematic in view of the fact that texture (e.g. porosity) tends to superimpose the angular profile. Several methods have been proposed to calculate the line broadening which should be affected by crystallite size alone. For the present invention, the method suggested by Jones (F. W. Jones, Proc. Roy. Soc (London) 166 A (1938)) is used. The widths of the line profiles at the half maximum of sample and reference are measured. By means of a correction function, the width of pure diffraction profile can be determined. The crystallite size is subsequently calculated by applying Scherrer's equation (P. Scherrer, Göttinger-Nachrichten 2 (1918) p. 98).

Xylene Density

The analysis is based on the principle of liquid exclusion as defined in DIN 51 901. Approx. 2.5 g (accuracy 0.1 mg) of powder is weighed in a 25 ml pycnometer. Xylene is added under vacuum (15 Torr). After a few hours dwell time under normal pressure, the pycnometer is conditioned and weighed.

The density represents the ratio of mass and volume. The mass is given by the weight of the sample and the volume is calculated from the difference in weight of the xylene filled pycnometer with and without sample powder.

Specific BET Surface Area

The method is based on the registration of the absorption isotherm of liquid nitrogen in the range $p/p0=0.04-0.26$, at 77 K.

Following the procedure proposed by Brunauer, Emmet and Teller (Adsorption of Gases in Multimolecular Layers, *J. Am. Chem. Soc.*, 1938, 60, 309-319), the monolayer capacity can be determined. On the basis of the cross-sectional area of the nitrogen molecule, the monolayer capacity and the weight of sample, the specific surface can then be calculated.

Oil Absorption

Sample powder is blended into a large variety of systems where absorption is an important parameter. The oil test is a means to determine the general behaviour of graphite materials in terms of absorption.

A slow filter paper is placed into a centrifuge metal tube having an inner diameter of 13.5 mm and a sieve on the bottom (18 mesh). In order to wet the filter, 0.5 g of paraffin oil is filled into the tube and centrifuged for 30 minutes at 521 g (1 g=9.81 m/s2, corresponding to 1500 rpm in the Sigma 6-10 centrifuge). After the wetting procedure, the tube is weighed and 0.5 g of graphite powder is added. The graphite is covered with 1.5 g of paraffin oil and centrifuged for 90 minutes at 521 g. After centrifuging, the tube is weighed. The oil absorption per 100 g of graphite powder is calculated on the basis of the weight increase.

Spring-Back

The spring-back is a source of information regarding the resilience of compacted graphite powders. A defined amount of powder is poured into a die. After inserting the punch and sealing the die, air is evacuated from the die. Compression force of 1.5 metric tons/cm$^2$ is applied and the powder height is recorded. This height is recorded again after pressure has been released. Spring-back is the height difference in percent relative to the height under pressure.

Apparent Density and Bulk Density by the Scott Volumeter

The Scott density is determined by passing the dry carbon powder through the Scott volumeter according to ASTM 329-98 (2003). The powder is collected in a 1 in 3 vessel (corresponding to 16.39 cm$^3$) and weighed to 0.1 mg accuracy. The ratio of weight and volume corresponds to the Scott density. It is necessary to measure three times and calculate the average value. The bulk density of graphite is calculated from the weight of a 250 ml sample in a calibrated glass cylinder.

Tap Density 100 g of dry graphite powder is carefully poured into a graduated cylinder. Subsequently, the cylinder is fixed on the off-centre shaft-based tapping machine and 1500 strokes are run.

The reading of the volume is taken and the tap density is calculated.

Reference: -DIN-ISO 787-11

Pressed Density

A defined amount of graphite powder is poured into a die. After inserting the punch and sealing the die, compression force of 2.5 metric tons/cm$^2$ is applied. After ejection of the test bar dimensions (W×L×H) are taken. Pressed density is the ratio of mass to volume.

Particle Size Distribution Laser Diffraction

The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into particle size distribution by means of a calculator. A small sample of graphite is mixed with a tow drops of wetting agent and a small amount of water. The sample prepared in the described manner is introduced in the storage vessel of the apparatus and measured.

References: -ISO 13320-1/-ISO 14887

Electrical Resistivity

The electrical resistivity is measured on defined compacted test bars (50×12×6 mm, compacting pressure: 2.5 t/cm$^2$). In order to be able to distinguish between the various graphites a very accurate and reliable method has to be used. The four-point method applied for these measurements greatly reduces the possibility of errors due to poor contacts.

Transverse Rupture Strength

The transverse rupture strength is measured on graphite compacts pressed to bars with size of 50×12×6 mm and 30×20×10 mm without binder. Other measurements carried out on test pieces with dimensions of 50×12×8 mm show comparable results.

Transversal Rupture Strength of Graphite Mixtures

A mixture of 95% EMD (DELTA EMP TA) and 5% of the graphite sample is mixed in a TURBULA mixer. 3 rings with an outer diameter of 24.3 mm, an inner diameter of 16.0 mm and a length of 1 cm are pressed per graphite sample with a pressure of 3 t/cm$^2$. The samples are conditioned for 12 h at 25° C. and a relative humidity of 65%. These rings are broken using a LF plus press, Lloyd Instruments with a force reported in Newtons [N].

Electrical Resistivity of Graphite Mixtures

A mixture of 95% EMD (DELTA EMD TA) and 5% of the graphite sample is prepared using a TURBULA mixer. Rectangular-formed samples (10 cm×1 cm×1 cm) are pressed with 3 t/cm$^2$. The samples are conditioned for 12 h at 25° C. and a relative humidity of 65%. The electrical resistivity is measured with a 4-points measurement in mΩ cm.

Active Surface Area (ASA)

The concept of the active surface area is based on the fact that, during chemisorption of oxygen at degassed carbon surfaces at 300° C. and an oxygen partial pressure of 50-100 Pa, surface oxygen complexes are formed on a specific part of the graphite surface called the active surface area. The ASA is composed of active sites that exist on the carbon surface where the carbon atom valency is not satisfied. On a "clean" graphite surface, these active sites would be located on the edges of the exposed graphene layer planes (prismatic surfaces), as well as at points of imperfection in the graphite structure including vacancies, dislocations and steps in the outer basal plane surfaces. They can be attributed to structural features, heteroatoms (O, S, N), and mineral matter. The amount of oxygen complexes formed on these active sites after oxygen chemisorption at 300° C. is determined by measuring the amount of CO and $CO_2$ evolved in a subsequent thermodesorption experiment from temperatures above the chemisorption temperature up to 950° C. since it was shown that CO and $CO_2$ are primary species of the oxide complex decomposition.

Experimental Procedure

Weigh precisely an aliquot (0.5-1.0 g) of carbon, put it in a fused silica tube. Heat-treat under vacuum (10-4 Pa) at 950° C. for 2 hours with a heating rate of 10° C./min.

Cool the sample down to 300° C. under vacuum.

Expose to oxygen at this temperature for 10 hours at 66.5 Pa

Bring pressure to 10-4 Pa at 300° C. Heat-treat the sample up to 950° C. with a rate of 10° C./min and hold the temperature for 15 minutes. The amount of CO and $CO_2$ is measured by mass spectroscopy.

$$ASA = Na(nCO + 2nCO_2)a/m$$

Where Na=Avogadro number
nCO=amount of CO desorbed (mol)
$nCO_2$=amount of $CO_2$ desorbed (mol)
a=area occupied by an active site
m=sample mass Resistivity/Density Versus Pressure Measurements Measurements are performed by using the technical equipment schematically depicted in FIG. 6.

Experimental Procedure:

Pressure range: 50 to 450 kg/cm².

Sample mass about 1 g

Mounted into an electrical insulated mould with an internal cross section of 1 cm²

A Keithley 2000 digital multimeter measures the electrical resistance

The height of the sample is measured with an accuracy of 0.1 mm.

Both height and electrical resistance of the sample are measured at a given pressure after about 30 seconds which are necessary to stabilize the sample.

Thermogravimetric Analysis:

The determination of $T_{15\%}$ is performed by using conventional therrnoaravirnetric equipment. The atmosphere in the thermogravimetric equipment is air.

Rhombohedral Fraction of Graphite Materials:

The determination of the rhombohedral fraction is based on the 2 theta range between 41° and 47° of the XRD pattern:

The intensity of the (101) 3R peak (typically at ca. 43.3°) generated by the rhombohedral stacking and the (101) 2H peak (typically at 44.5°) generated by the hexagonal stacking of the graphite layer is compared: I (101) 3R/I (101) 2H*100%.

Materials

Graphite

Synthetic graphites were manufactured by graphitizing carbon precursors under graphitization conditions. The resulting synthetic graphites showed ash contents below 0.1% and a high degree of crystallinity (c/2=0.3354-0.3356 nm, Lc=50-1000 nm, Xylene densities=2.25-2.27 g/cm³). The particle size distribution of the considered materials had $d_{50}$ values between 3 and 50 microns (MALVERN) and specific BET surface areas between 1 and 20 m²/g.

Natural graphites were manufactured by purifying natural graphite ore by flotation and a subsequent thermal or chemical purification leading to ash contents below 0.1%. The material properties are the same as for the synthetic graphites.

Electrolytic Manganese Dioxide (EMD)

The EMD used throughout the investigations showed an average particle size of 30-40 micron and a bulk density of 4.5 g/cm³.

Experimental Details for the HOGA Graphite Preparation

The HOGA graphite was prepared in a DRAIS SUPERFLOW® DCP-SF12 attrition mill. Graphite was dispersed in water (10%) at a pH of 8-11 adjusted by adding conc. aqueous ammonia solution. The graphite dispersion was grinded with a flow of 2 L/min at a speed of 1000 rpm for different cycles. If not stated differently, 15 cycles were applied. After the mechanical treatment, the graphite was recovered in a conventional drying process in air at 160° C. or directly used as an aqueous dispersion for the coating experiments.

Evolution of the specific BET surface area, spring back, particle size distribution, the electrical resistivity R of a compressed mixture of EMD and 7% graphite, the rupture strength RS of a compressed LR14 ring of a mixture of EMD and 7% graphite, the correlation length La was determined from the Raman experiment. The concentration of oxygen at the graphite surface as determined from the X-ray photoelectron spectroscopy (XPS) of synthetic graphite with increasing treatment cycles in the attrition mill are listed in Table 3 below.

Table 3: Evolution of Graphite Parameters with Increasing Treatment Cycles

TABLE 3

Evolution of graphite parameters with increasing treatment cycles

| Cycles | BET m²/g | Spring Back % | Malvern [μm] | | | La [nm] | O1s [at %] | R [mΩ cm] | RS [N] |
|---|---|---|---|---|---|---|---|---|---|
| | | | d10 | d50 | d90 | | | | |
| 0 | 5.6 | 12.2 | 6.2 | 18.5 | 44.1 | 101 | 1.417 | 146 | 7.6 |
| 1 | 7.1 | 10.1 | 7.2 | 19.6 | 42.7 | | | 93 | 9.3 |
| 5 | 10.5 | 8.7 | 7.2 | 18.9 | 41.0 | 61 | | 70 | 10.9 |
| 15 | 15.5 | 7.9 | 7.4 | 18.2 | 36.7 | 91 | 1.612 | 72 | 12.4 |
| 30 | 19.6 | 7.7 | 7.5 | 17.7 | 34.2 | | | 80 | 11.6 |

EXAMPLES

Example 1

| Graphite Parameter | | Starting material synthetic graphite | HOGA graphite |
|---|---|---|---|
| Interlayer distance (c/2) (002)/(004) | nm | 0.3355/0.3355 | 0.3355/0.3355 |
| Crystallite size Lc (002)/(004) | nm | 168/145 | 137/92 |
| Rhombohedral fraction $R_f$ | % | 25 | 0/0 |
| Xylene density | g/cm$^3$ | 2.259 | 2.260 |
| BET SSA | m$^2$/g | 5 | 15 |
| Bulk density | g/cm$^3$ | 0.184 | 0.219 |
| Tapping density | g/cm$^3$ | 0.357 | 0.352 |
| Pressed density (2.5 t/cm$^2$) | g/cm$^3$ | 1.996 | 1.99 |
| Spring back | % | 9.5 | 8.2 |
| Transversal rupture strength (100% graphite) at pressed density (2.5 t/cm$^2$) | N | 8.0 | 11.5 |
| Electrical resistivity (100% graphite) at pressed density (2.5 t/cm$^2$) | mΩ cm | 0.972 | 0.937 |
| Oil adsorption DPB | g/100 g | 134 | 96 |
| Malvern d10/d50/d90 | μm | 6.6/18.9/41.8 | 8.4/21.5/41.4 |
| Flexural strength (EMD/5% graphite) | N | 8.6 | 11.0 |
| Electrical resistivity (EMD/5% graphite) | mΩ cm | 368 | 174 |
| Flexural strength (EMD/7% graphite) | N | 8.6 | 11.7 |
| Electrical resistivity (EMD/7% graphite) | mΩ cm | 93 | 59 |

Example 2

| Graphite Parameter | | Starting material synthetic graphite | HOGA graphite |
|---|---|---|---|
| Interlayer distance (c/2) (002)/(004) | nm | 0.3356/0.3355 | 0.3356/0.3355 |
| Crystallite size Lc (002)/(004) | nm | 144/109 | 94/65 |
| Rhombohedral fraction $R_f$ | % | 36 | 0 |
| Xylene density | g/cm$^3$ | 2.262 | 2.260 |
| BET SSA | m$^2$/g | 8.8 | 18.7 |
| Bulk density | g/cm$^3$ | 0.142 | 0.214 |
| Tapping density | g/cm$^3$ | 0.200 | 0.321 |
| Pressed density (2.5 t/cm$^2$) | g/cm$^3$ | 1.926 | 1.943 |
| Spring back | % | 10.8 | 8.4 |
| Transversal rupture strength (100% graphite) at pressed density (2.5 t/cm$^2$) | N | 8.1 | 12.1 |
| Electrical resistivity (100% graphite) at pressed density (2.5 t/cm$^2$) | mΩ cm | 1.288 | 1.340 |
| Oil adsorption DPB | g/100 g | 201 | 159 |
| Malvern d10/d50/d90 | μm | 3.3/7.9/16.2 | 6.4/13.0/23.3 |
| Transversal rupture strength (EMD/5% graphite) of pressed LR14 rings (3 t/cm$^2$) | N | 8.7 | 10.4 |
| Electrical resistivity (EMD/5% graphite) of pressed rectangular bodies (3 t/cm$^2$) | mΩ cm | 251 | 181 |

Example 3

| Graphite Parameter | | Starting material synthetic graphite | HOGA graphite |
|---|---|---|---|
| Interlayer distance (c/2) (002)/(004) | nm | 0.3357/0.3355 | 0.3357/0.3355 |
| Crystallite size Lc (002)/(004) | nm | 128/92 | 86/57 |
| Rhombohedral fraction $R_f$ | % | 22 | 0 |
| Xylene density | g/cm$^3$ | 2.249 | 2.256 |
| BET SSA | m$^2$/g | 8.7 | 22.8 |
| Bulk density | g/cm$^3$ | 0.263 | 0.446 |
| Tapping density | g/cm$^3$ | 0.238 | 0.370 |
| Pressed density (2.5 t/cm$^2$) | g/cm$^3$ | 1.875 | 1.933 |
| Spring back | % | 15.7 | 9.6 |
| Transversal rupture strength (100% graphite) at pressed density (2.5 t/cm$^2$) | N | 3.9 | 12.0 |
| Electrical resistivity (100% graphite) at pressed density (2.5 t/cm$^2$) | mΩ cm | 1.647 | 1.523 |
| Oil adsorption DPB | g/100 g | 109 | 136 |
| Malvern d10/d50/d90 | μm | 4.8/18.9/45.5 | 6.7/15.4/30.9 |
| Transversal rupture strength (EMD/7% graphite) of pressed LR14 rings (3 t/cm$^2$) | N | 6.0 | 11.8 |

-continued

| Graphite Parameter | | Starting material synthetic graphite | HOGA graphite |
|---|---|---|---|
| Electrical resistivity (EMD/7% graphite) of pressed rectangular bodies (3 t/cm²) | mΩ cm | 472 | 99 |

Example 4

| Graphite Parameter | | Starting material natural graphite | HOGA graphite |
|---|---|---|---|
| Interlayer distance (c/2) (002)/(004) | nm | 0.3357/0.3355 | 0.3357/0.3355 |
| Crystallite size Lc (002)/(004) | nm | 214/120 | 165/106 |
| Rhombohedral fraction $R_f$ | % | 35 | 0 |
| Xylene density | g/cm³ | 2.269 | 2.266 |
| BET SSA | m²/g | 4.4 | 10.2 |
| Bulk density | g/cm³ | 0.181 | 0.291 |
| Tapping density | g/cm³ | 0.224 | 0.385 |
| Pressed density (2.5 t/cm²) | g/cm³ | 2.051 | 2.023 |
| Spring back | % | 7.2 | 8.0 |
| Transversal rupture strength (100% graphite) at pressed density (2.5 t/cm²) | N | 8.3 | 11.2 |
| Electrical resistivity (100% graphite) at pressed density (2.5 t/cm²) | mΩ cm | 0.863 | 0.837 |
| Oil adsorption DPB | g/100 g | 150 | 117 |
| Malvern d10/d50/d90 | μm | 6.5/18.5/40.2 | 7.9/19.8/39.6 |
| Transversal rupture strength (EMD/5% graphite) of pressed LR14 rings (3 t/cm²) | N | 9.6 | 10.2 |
| Electrical resistivity (EMD/5% graphite) of pressed rectangular bodies (3 t/cm²) | mΩ cm | 593 | 248 |
| Flexural strength (EMD/7% graphite) | N | 9.7 | 12.4 |
| Electrical resistivity (EMD/7% graphite) | mΩ cm | 142 | 78 |

Example 5

| Graphite Parameter | | Starting material synthetic graphite | HOGA graphite |
|---|---|---|---|
| Interlayer distance (c/2) (002)/(004) | nm | 0.3355/0.3355 | 0.3355/0.3355 |
| Crystallite size Lc (002)/(004) | nm | 170/129 | 104/84 |
| Rhombohedral fraction $R_f$ | % | 33 | 0 |
| Xylene density | g/cm³ | 2.263 | 2.263 |
| BET SSA | m²/g | 6.6 | 16.0 |
| ASA (active surface area) | m²/g | 0.9 | 2.92 |
| Bulk density | g/cm³ | 0.154 | 0.212 |
| Tapping density | g/cm³ | 0.255 | 0.333 |
| Pressed density (2.5 t/cm²) | g/cm³ | 1.898 | 1.888 |
| Spring back | % | 10.2 | 5.8 |
| Transversal rupture strength (100% graphite) at pressed density (2.5 t/cm²) | N | 7.9 | 11.9 |
| Electrical resistivity (100% graphite) at pressed density (2.5 t/cm²) | mΩ cm | 1.212 | 1.222 |
| OH adsorption DPB | g/100 g | 175 | 147 |
| Malvern d10/d50/d90 | μm | 3.9/9.0/17.8 | 6.1/13.1/24.1 |
| Transversal rupture strength (EMD/5% graphite) of pressed LR14 rings (3 t/cm²) | N | 8.7 | 10.4 |
| Electrical resistivity (EMD/5% graphite) of pressed rectangular bodies (3 t/cm²) | mΩ cm | 390 | 215 |

Example 6

| Graphite Parameter | | Starting material synthetic graphite | HOGA graphite |
|---|---|---|---|
| Interlayer distance (c/2) (002)/(004) | nm | 0.3358/0.3356 | 0.3357/0.3356 |
| Crystallite size Lc (002)/(004) | nm | 78/45 | 55/32 |
| Rhombohedral fraction $R_f$ | % | 41 | 0 |
| Xylene density | g/cm³ | 2.254 | 2.254 |
| BET SSA | m²/g | 18.6 | 34.1 |
| Bulk density | g/cm³ | 0.272 | 0.210 |

-continued

| Graphite Parameter | | Starting material synthetic graphite | HOGA graphite |
|---|---|---|---|
| Tapping density | g/cm$^3$ | 0.376 | 0.323 |
| Pressed density (2.5 t/cm$^2$) | g/cm$^3$ | 1.856 | 1.893 |
| Spring back | % | 12.2 | 9.2 |
| Transversal rupture strength (100% graphite) at pressed density (2.5 t/cm$^2$) | N | 9.7 | 12.8 |
| Electrical resistivity (100% graphite) at pressed density (2.5 t/cm$^2$) | mΩ cm | 2.509 | 2.085 |
| Oil adsorption DPB | g/100 g | 171 | 153 |
| Malvern d10/d50/d90 | μm | 1.6/3.6/6.7 | 5.4/11.0/19.2 |
| Transversal rupture strength (EMD/5% graphite) of pressed LR14 rings (3 t/cm$^2$) | N | 6.2 | 8.1 |
| Electrical resistivity (EMD/5% graphite) of pressed rectangular bodies (3 t/cm$^2$) | mΩ cm | 843 | 471 |

The invention claimed is:

1. A graphite powder comprising:
   highly oriented grain aggregates,
   wherein the electrical resistivity of the powder decreases with increasing density.

2. The graphite powder according to claim 1, wherein the electrical resistivity of the powder is decreasing with increasing density between 10 and 40% in the density range between 1.5 and 1.8 g/cm$^3$.

3. The graphite powder according to claim 1, wherein the average particle size is between 10 and 50 microns and the BET surface area is higher than 10 m$^2$/g.

4. The graphite powder according to claim 1, wherein the average particle size is between 5 and 10 microns and the BET surface area is higher than 15 m$^2$/g.

5. The graphite powder according to claim 1, wherein the average particle size is between 1 and 5 microns and the BET surface area is higher than 25 m$^2$/g.

6. The graphite powder according to claim 1, wherein the crystal size in the crystallographic c-direction (Lc) is larger than 10 nm.

7. The graphite powder according to claim 1, wherein the spring-back is less than or equal to 10%.

8. The graphite powder according to claim 1, wherein the fraction of rhombohedral crystallinity is less than 10%.

9. The graphite powder according to claim 1, wherein substantially no rhombohedral stacking is present, and the graphite powder has a loss of at least 15% by weight as measured by thermogravimetric analysis (TGA) at a temperature below 730° C.

10. A process for coating a substrate comprising:
    providing a coating dispersion comprising the graphite powder according to claim 1; and
    applying the coating dispersion to the substrate.

11. The process of claim 10, wherein the providing comprises mechanically treating a starting graphite powder in a liquid medium to obtain the highly oriented grain aggregates.

12. The process of claim 11, wherein the liquid medium is water.

13. The process of claim 10, wherein the substrate comprises a current collector.

14. An electrode containing the graphite powder according to claim 1.

15. The electrode of claim 14, wherein, at a concentration of 5% of the graphite powder, the electrical resistivity in the electrode is at least 20% lower than for comparative graphite material not mechanically treated in the presence of a liquid medium.

16. A coating dispersion comprising the graphite powder according to claim 1 dispersed in a liquid medium.

17. The coating according to claim 16, wherein the liquid medium comprises water.

18. A battery comprising the graphite powder according to claim 1.

19. A compressed body of pure graphite, wherein the graphite is made from the graphite powder according to claim 1.

20. A lubricant comprising the graphite powder according to claim 1.

* * * * *